(12) United States Patent
Matsumoto

(10) Patent No.: US 12,521,891 B2
(45) Date of Patent: Jan. 13, 2026

(54) SEALANT APPLICATION APPARATUS AND METHOD OF PRODUCING SEALANT APPLIED PRODUCT

(71) Applicant: SUBARU CORPORATION, Tokyo (JP)

(72) Inventor: Yohei Matsumoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 415 days.

(21) Appl. No.: 18/056,454

(22) Filed: Nov. 17, 2022

(65) Prior Publication Data

US 2023/0182317 A1 Jun. 15, 2023

(30) Foreign Application Priority Data

Dec. 13, 2021 (JP) ................................ 2021-202065

(51) Int. Cl.
*B25J 11/00* (2006.01)
*B05B 13/04* (2006.01)
(Continued)

(52) U.S. Cl.
CPC ....... *B25J 11/0075* (2013.01); *B05B 13/0431* (2013.01); *B25J 9/1651* (2013.01); *B25J 9/1664* (2013.01); *B25J 13/089* (2013.01)

(58) Field of Classification Search
USPC ................ 118/300, 321, 323, 679–681, 682
See application file for complete search history.

(56) References Cited

U.S. PATENT DOCUMENTS

| 10,035,287 B2 | 7/2018 | Song |
| 10,252,452 B2 | 4/2019 | Song |
| 10,807,118 B2 | 10/2020 | Matsumoto |

(Continued)

FOREIGN PATENT DOCUMENTS

| JP | 2012-050968 A | 3/2012 |
| JP | 2016-097678 A | 5/2016 |

(Continued)

OTHER PUBLICATIONS

Extended European Search Report mailed May 12, 2023 in European Patent Application No. 22206948.6 (7 pages).

(Continued)

*Primary Examiner* — Yewebdar T Tadesse
(74) *Attorney, Agent, or Firm* — Smith, Gambrell & Russell, LLP

(57) ABSTRACT

A sealant application apparatus includes a seal gun, a distance meter, a moving mechanism and a controller. The seal gun has a nozzle for discharging sealant toward a fastener. The distance meter is fixed to the nozzle. The distance meter measures a distance from a measurement position to a surface of the sealant. The moving mechanism moves the seal gun relatively to the fastener. The controller controls the moving mechanism and the seal gun. The sealant is started to be discharged out from the seal gun in a state where the nozzle has been positioned to cover the fastener at a position away from a surface of the object by a predetermined distance. Subsequently, the sealant is applied to the fastener under a sealant application condition according to the distance measured by the distance meter while moving the nozzle away from the surface of the object.

8 Claims, 3 Drawing Sheets

(51) Int. Cl.
  *B25J 9/16* (2006.01)
  *B25J 13/08* (2006.01)

(56) References Cited

U.S. PATENT DOCUMENTS

| | | |
|---|---|---|
| 11,052,542 B2 | 7/2021 | Takizawa |
| 11,103,885 B2 | 8/2021 | Matsumoto |
| 11,117,158 B2 | 9/2021 | Matsumoto et al. |
| 11,192,137 B2 | 12/2021 | Shang et al. |
| 11,279,028 B2 | 3/2022 | Miyamoto et al. |
| 12,303,931 B2 | 5/2025 | Miyauchi et al. |
| 2004/0005411 A1* | 1/2004 | Hubert ............... B05C 11/1018 427/256 |
| 2018/0009000 A1 | 1/2018 | Shang et al. |
| 2019/0232327 A1 | 8/2019 | Pidan et al. |
| 2019/0291130 A1* | 9/2019 | Wilkens ............... F16B 33/004 |
| 2021/0095708 A1 | 4/2021 | Dumas et al. |

FOREIGN PATENT DOCUMENTS

| | | |
|---|---|---|
| JP | 2017-012982 A | 1/2017 |
| JP | 2019-522564 A | 8/2019 |
| JP | 2019-162613 A | 9/2019 |
| JP | 2020-049641 A | 4/2020 |
| JP | 2020-058990 A | 4/2020 |
| JP | 2020-058991 A | 4/2020 |
| JP | 2020-058992 A | 4/2020 |
| JP | 2023-041334 A | 3/2023 |

OTHER PUBLICATIONS

Notice of Reasons for Refusal mailed Jul. 16, 2025 in Japanese Patent Application No. 2021-202065 (3 pages in Japanese; 4 pages in English translation).

* cited by examiner

SEALANT APPLICATION APPARATUS AND METHOD OF PRODUCING SEALANT APPLIED PRODUCT

CROSS REFERENCES TO RELATED APPLICATIONS

This application is based upon and claims the benefit of priority from Japanese Patent Application No. 2021-202065, filed on Dec. 13, 2021; the entire contents of which are incorporated herein by reference.

FIELD

Implementations described herein relate generally to a sealant application apparatus and a method of producing a sealant applied product.

BACKGROUND

Conventionally, various types of sealant application apparatus, which applies sealant to an object, are known (for example, refer to Japanese Patent Application Publication JP2012-050968 A). As a concrete example, a sealing system for applying dome sealant to the head of a fastener is known. This sealing system has a nozzle for discharging the sealant as well as a robot arm to which a distance meter, a camera, and a force sensor are attached. Thereby, the distance from the nozzle to a part can be measured by the distance meter while the quantity and shape of the sealant can be observed by the camera. In addition, the nozzle can be positioned by detecting a contact of the nozzle with the part by the force sensor and subsequently retracting the nozzle (for example, refer to Japanese Patent Application Publication JP2019-522564 A).

As another example, a sealant discharge apparatus having a robot arm to which a laser distance meter in addition to a seal gun having a nozzle for discharging sealant are attached is also suggested (for example, refer to Japanese Patent Application Publication JP2020-058990 A). This sealant discharge apparatus allows controlling the volume of sealant as well as the movement speed of the seal gun, based on the volume change of the accumulated sealant grasped using the laser distance meter.

Similarly, a liquid application system having a laser distance meter for measuring the thickness of applied liquid, such as sealant, discharged to a workpiece from a nozzle of a dispenser head attached to a robot arm as an end effector so that the dispenser head can be moved by the robot arm according to a measurement result is also proposed (for example, refer to Japanese Patent Application Publication JP2019-162613 A and Japanese Patent Application Publication JP2020-049641 A).

However, when sealant for a cap seal of a fastener using the conventional sealant application apparatus has viscosity and elasticity changing for a short time, the quality of the cap seals may has variation or defect. This is because the amount of discharged sealant is unstable.

Accordingly, it is considered that change in viscosity of sealant should be suppressed in order to prevent variation and fault in the quality of a cap seal when the viscosity and/or elasticity of the sealant changes for a short time. Factors of change in viscosity of sealant include an ambient environmental variation, such as a temperature change, besides curing of the sealant due to the mixture of raw materials consisting of two liquids.

What is necessary to suppress the influence of the curing of the sealant due to the mixture of the two liquids is to mix the two liquids just before discharging the sealant by preparing a mixing mechanism in the seal gun. However, problems that the mechanism of the seal gun becomes complicated, and thereby not only the weight of the seal gun increases, but the maintenance of the seal gun takes time arise.

Meanwhile, reducing environmental variations, such as a temperature variation, requires air conditioning management by covering the whole sealant application apparatus, as well as keeping the temperature of the sealant constant by warming the sealant with a heater. However, in this case, not only the problem that the installation cost of an air-conditioning equipment is required, but the problem that the quality of the sealant may be deteriorated due to the warming arise.

Under such a background, a cap seal of a fastener with sealant whose viscosity and elasticity change for a short time has to be manually performed by a worker in many cases. That is, it is not easy to automate a cap seal of a fastener.

Accordingly, an object of the present invention is to allow an automatic and stable cap seal of a fastener with sealant whose viscosity or elasticity changes for a short time, using simpler devices and equipment without deterioration in quality.

SUMMARY OF THE INVENTION

In general, according to one implementation, a sealant application apparatus for applying sealant to a fastener fastened to an object includes a seal gun, a distance meter, a moving mechanism and a controller. The seal gun has a nozzle for discharging the sealant toward the fastener. A front end portion of the nozzle has a shape corresponding to an initial shape of the sealant applied to the fastener. The distance meter is fixed to the nozzle. The distance meter measures a distance from a measurement position to a surface of the sealant discharged from the nozzle and covering the fastener. The moving mechanism is configured to move the seal gun together with the distance meter relatively to the fastener. The controller is configured to control the moving mechanism and the seal gun so that the sealant is started to be discharged out from the seal gun in a state where the nozzle has been positioned to cover the fastener at a position away from a surface of the object by a predetermined distance; and subsequently, the sealant is applied to the fastener under a sealant application condition according to the distance measured by the distance meter while moving the nozzle away from the surface of the object.

Further, according to one implementation, a method of producing a sealant applied product including the object and the cap-sealed fastener includes applying the sealant to the fastener by the above-mentioned sealant application apparatus.

DETAILED DESCRIPTION

A sealant application apparatus and a method of producing a sealant applied product according to implementations of the present invention will be described with reference to the accompanying drawings.

(Structure and Function of Sealant Application Apparatus)

Figure 1:
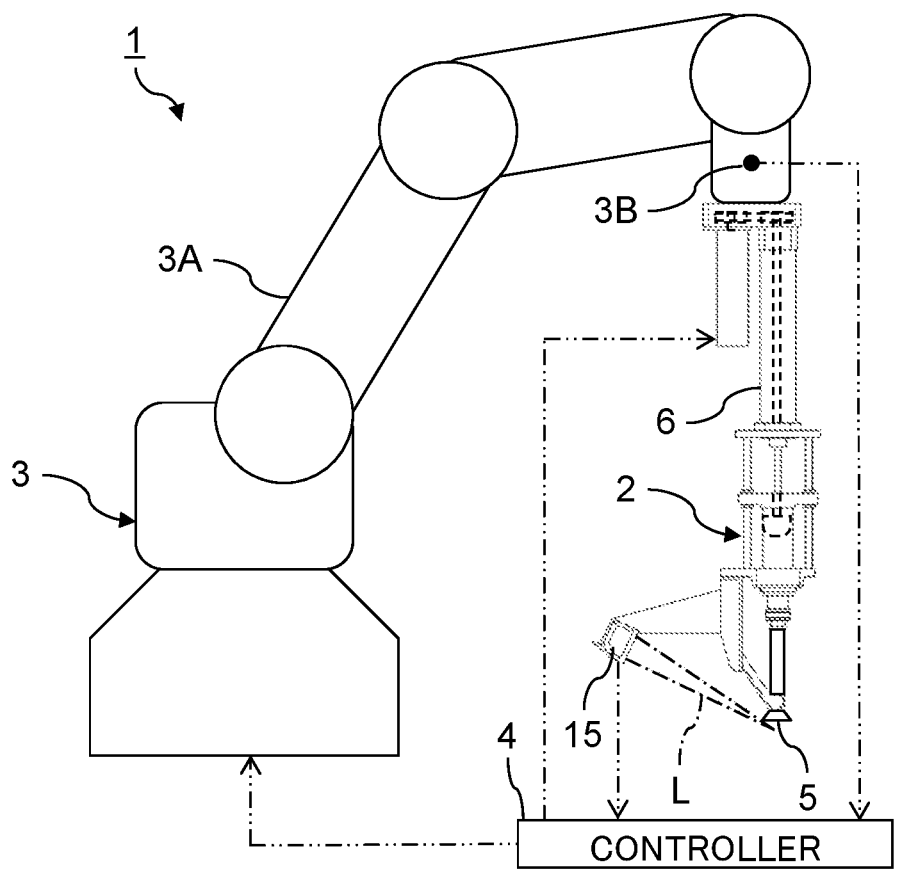
FIG. 1 shows structure of a sealant application apparatus according to an implementation of the present invention.
Figure 2:
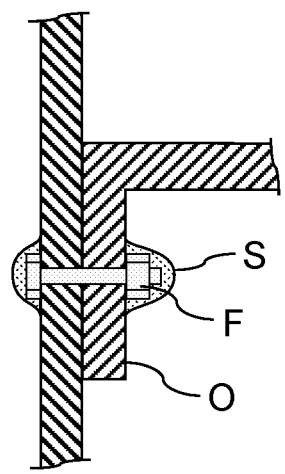
FIG. 2 shows an example of a fastener applied with sealant using the sealant application apparatus shown in FIG. 1.

FIG. 1 shows structure of a sealant application apparatus according to an implementation of the present invention. FIG. 2 shows an example of a fastener applied with sealant using the sealant application apparatus shown in FIG. 1.

A sealant application apparatus 1 is an apparatus for applying a sealant S to a fastener F fasten to an object O. As exemplified by FIG. 2, when the fastener F, such as a bolt or a rivet, is inserted into a through hole formed in the object O consisting of parts in order to couple the parts of the object O to each other, a part of the fastener F including a nut and the like is projected from the object O. There is a small gap between the fastener F and the object O. Moreover, the part of the fastener F projected from the object O has not been generally coated with paint aimed at rustproofing or the like. Therefore, the part of the fastener F projected from the object O is sometimes required to be covered with the sealant S. In particular, when the object O is an aircraft part, the part of the fastener F projected from the object O is required to be covered with the sealant S in many cases.

Sealing a gap between the fastener F and the object O with the sealant S is referred to as cap sealing or cap seal. Moreover, the dome or bell-shaped sealant S applied for sealing the gap between the fastener F and the object O is referred to as a cap seal.

The sealant application apparatus 1 can be composed of a seal gun 2, a moving mechanism 3 and a controller 4. The seal gun 2 discharges the sealant S towards the fastener F. The moving mechanism 3 moves the seal gun 2 relatively to the fastener F. The seal gun 2 is a discharging device of the sealant S having a nozzle 5 and a dispenser 6. The nozzle 5 discharges the sealant S towards the fastener F. The dispenser 6 supplies the sealant S to the nozzle 5.

It is practical to use an articulated robot 3A, having an arm as exemplified by FIG. 1, as the moving mechanism 3 for a reason of easy installation and cost. When the moving mechanism 3 is the articulated robot 3A, the seal gun 2 can be attached to the end portion of the arm of the articulated robot 3A, as an end effector.

Alternatively, the moving mechanism 3 may be composed of at least one desired machine element, such as gears, a ball screw, a caterpillar track, a cylinder mechanism, wheels and rollers, moving in parallel in orthogonal three axis directions or the like and/or rotating around a desired rotation axis. That is, the seal gun 2 may be moved by a gantry.

At least one force sensor 3B may be attached to the moving mechanism 3 in order to detect that the end part of the nozzle 5 contacted to the surface of the object O. The commercial typical articulated robot 3A can be optionally provided with the force sensors 3B for measuring the pressures in orthogonal three axis directions and the moments around the orthogonal three axis direction.

The controller 4 consists of electric circuitry, such as a computer, for integrally controlling the moving mechanism 3 and the seal gun 2. When the control systems of the seal gun 2 and the moving mechanism 3 are not electric but pneumatic and/or hydraulic, pneumatic circuitry and/or hydraulic circuitry may be used for a part of the controller 4.

Figure 3:
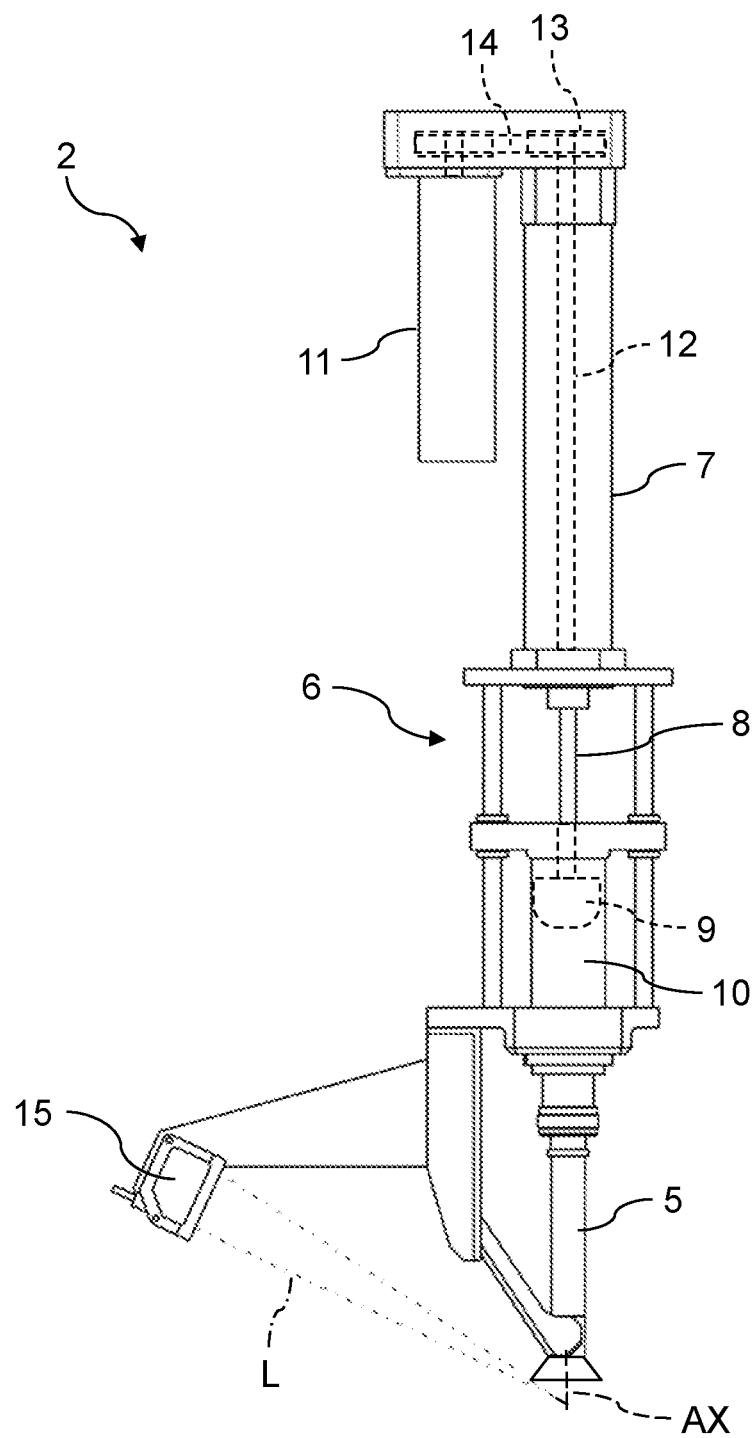
FIG. 3 shows an example of detailed structure of the seal gun shown in FIG. 1.

FIG. 3 shows an example of detailed structure of the seal gun 2 shown in FIG. 1.

FIG. 3 shows an example of structure of the seal gun 2 of an electric servo type. As mentioned above, the seal gun 2 has the nozzle 5 and the dispenser 6. The outlet port of the dispenser 6 is coupled to the inlet port of the nozzle 5.

The end portion of the nozzle 5 which forms the outlet of the nozzle 5 has a shape corresponding to the initial form of the sealant S after the sealant S was applied to the fastener F. More specifically, the end portion of the nozzle 5 has a shape that the inner diameter gradually becomes large toward the open end so that the sealant S can be applied to the head or nut of the fastener F in a dome shape or a bell shape in a state that the head or nut of the fastener F is covered by the nozzle 5 with forming a clearance gap between the end portion of the nozzle 5 and the surface of the object O.

The space inside the end portion of the nozzle 5 whose inner diameter gradually becomes large toward the open end can be filled up with the sealant S. That is, the end portion of the nozzle 5 has a space for being filled up with the sealant S in a state that the head or nut of the fastener F is not sealed but partially covered.

After the space inside the end portion of the nozzle 5 has been filled up with the sealant S and thereby the sealant S has attached to the fastener F, the nozzle 5 is retracted from the fastener F. When the nozzle 5 is retracted, the sealant S attached to the fastener F deforms into a shape according to the viscosity of the sealant S. Accordingly, although the space formed in the end portion of the nozzle 5 has the shape corresponding to the initial shape of the sealant S applied to the fastener F, the space does not coincide with neither the initial shape itself of the sealant S after the nozzle 5 has been retracted entirely, nor the shape of the sealant S after the nozzle 5 is started to be retracted.

In the illustrated example, the inner surface forming the space inside the end portion of the nozzle 5 has a shape of the side surface of a simple circular-truncated cone so that the sealant S can be applied to the portion of the fastener F projected from the object O about in a dome shape or a bell shape as a cap seal as exemplified by FIG. 2. That is, the end portion of the nozzle 5 has such a tapered inner surface that the inner diameter becomes large gradually toward the open end.

The dispenser 6 supplies the sealant S into the nozzle 5 mentioned above. For example, the dispenser 6 may be composed of an actuator 7, a rod 8, a pusher 9, and a cartridge 10 so that the pusher 9 fixed to the end of the rod 8 extendable by the actuator 7 can be pushed to the cartridge 10 and thereby the sealant S stored in the cartridge 10 can be pushed out to the inlet of the nozzle 5. The actuator 7 elongating and contracting the rod 8 can be composed of a motor 11 and a ball screw 12 rotating by the power of the motor 11. In the example shown in FIG. 3, the torque output from the output shaft of the motor 11 is transmitted to the ball screw 12 through pulleys 13 and a power transmission belt 14. As a matter of course, gears may be used.

In addition, a laser distance meter 15 is fixed to the nozzle 5. The laser distance meter 15 is a measuring instrument which detects a distance from a measurement position of the laser distance meter 15, such as an emitting position or a receiving position of a laser light L, to a reflection position by irradiating the laser light L and receiving the reflected laser light L. Therefore, the laser distance meter 15 is composed of a light emitting element for emitting the laser lights L, such as a semiconductor laser, and a light receiving element of the laser light L. The typical light receiving element of the laser distance meter 15 consists of a CMOS (Complementary Metal Oxide Semiconductor) sensor or a CCD (Charge Coupled Device) sensor.

The laser distance meter 15 is disposed at a position where the distance from a measurement position to the surface of the sealant S discharged from the nozzle 5 so as to cover the fastener F can be measured while avoiding the interference with the nozzle 5. More specifically, the laser distance meter 15 is disposed at a position where the distance to the surface of the sealant S leaking out from the gap between the end portion of the nozzle 5 and the surface of the object O can be measured after the sealant S was discharged toward the fastener F with forming the gap between the end portion of the nozzle 5 and the surface of the object O.

Therefore, directions of the emitted laser light L and the reflected laser light L each slants to both of the length direction of the nozzle 5 and the surface of the object O. Moreover, the optical axes of the laser light L emitted from the laser distance meter 15 and the laser light L reflected on the surface of the sealant S are each positioned to pass near the edge of the nozzle 5 so that the surface of the sealant S can be irradiated with the laser light L and the laser light L can be reflected on the surface of the sealant S immediately after the sealant S leaked out from the gap between the end portion of the nozzle 5 and the surface of the object O even when the gap is small.

Meanwhile, the shape of the outline of the nozzle 5 is also determined so that the nozzle 5 may not interfere with both of the laser light L emitted from the laser distance meter 15 and the laser light L reflected on the surface of the sealant S. That is, the shape of the nozzle 5 is determined to such a shape that the sealant S can be applied to the head or nut of the fastener F in a dome shape or a bell shape by covering the head or nut of the fastener F without interference with both of the laser light L emitted from the laser distance meter 15 and the laser light L reflected on the surface of the sealant S.

The sealant S discharged out towards the fastener F spreads almost circularly as viewed from the discharging direction of the sealant S. Therefore, it is considered that it becomes easier to observe the spreading speed of the sealant S at the diameter portion of the circular bottom of the sealant S filling up the inside of the nozzle 5 in an almost truncated cone shape or an almost bell shape.

Accordingly, the laser distance meter 15 can be disposed at a position at which a distance from a measurement position to the surface of the sealant S can be measured on a plane including the center axis AX of the nozzle 5. In other words, the laser distance meter 15 can be positioned so that each of the optical axis of the laser light L emitted from the laser distance meter 15 and the optical axis of the laser light L received by the laser distance meter 15 may intersect with the center axis AX of the nozzle 5. Thereby, it becomes easy to observe a displacement of the surface position of the sealant S with the laser distance meter 15.

After the inside of the nozzle 5 has been filled up with the sealant S, the moving mechanism 3 operates to move the seal gun 2 including the nozzle 5 away from the object O and the fastener F. Therefore, the laser distance meter 15 fixed to the nozzle 5 is also moved away from the object O and the fastener F together with the seal gun 2. That is, the laser distance meter 15 moves together with the seal gun 2 relatively to the object O and the fastener F by the moving mechanism 3.

While the nozzle 5 is being moved away from the object O, the distance to the surface of the sealant S whose shape is becoming an almost dome shape or an almost bell shape is sequentially measured by the laser distance meter 15. The measurement result of the distance to the surface of the sealant S acquired in the laser distance meter 15 is sequentially output to the controller 4 as time series data. That is, time change of the distance from the laser distance meter 15 to the surface of the sealant S is output from the laser distance meter 15 to the controller 4.

Meanwhile, the controller 4 is configured to integrally control the moving mechanism 3 and the seal gun 2 based on the distance to the surface of the sealant S measured by the laser distance meter 15. More specifically, the controller 4 is configured to control the moving mechanism 3 to position the seal gun 2 relatively to the object O and the fastener F, and control the seal gun 2 to start to discharge the sealant S as well as to control the moving mechanism 3 to retract the seal gun 2 from the object O and the fastener F, and control the seal gun 2 to stop discharging the sealant S, based on the distance from the laser distance meter 15 to the surface of the sealant S measured by the laser distance meter 15.

More specifically, the controller 4 is configured to control the moving mechanism 3 and the seal gun 2 so that the sealant S may be started to be discharged from the seal gun 2 in a state that the nozzle 5 has been positioned to cover the fastener F at a position away from the surface of the object O by a predetermined distance, and subsequently the sealant S may be applied to the fastener F under application conditions of the sealant S according to the distance from the laser distance meter 15 to the surface of the sealant S, measured with the laser distance meter 15, while moving the nozzle 5 away from the surface of the object O.

Examples of the application conditions of the sealant S which can be determined in the controller 4 based on the distance from the laser distance meter 15 to the surface of the sealant S include conditions influencing the shape of the applied sealant S, such as the start timing and speed of the movement of the moving mechanism 3 for moving the nozzle 5 away from the surface of the object O, timing of stopping discharging the sealant S from the seal gun 2, and the discharging amount of the sealant S from the seal gun 2.

Correctly controlling the discharging amount of the sealant S, having viscosity and elasticity changing for a short time, requires a complicated control mechanism and complicated control processing. Therefore, it is desired for simplification in control to focus controlling targets on the start timing and moving speed of retracting the nozzle 5 from the surface of the object O, and the timing of stopping discharging the sealant S from the seal gun 2.

In this case, the moving speed of the moving mechanism 3 for moving the nozzle 5 away from the surface of the object O can be feedback controlled by the controller 4 so that the distance from the laser distance meter 15 to the surface of the sealant S, measured with the laser distance meter 15, may approach the distance corresponding to the ideal shape of the sealant S applied to the fastener F after the moving mechanism 3 is started to operate to move the nozzle 5 away from the surface of the object O. Although a control command value of the feedback control may be the position of the nozzle 5 and the moving mechanism 3 instead of the moving speed, it is practical to set the retracting speed of the nozzle 5 and the moving mechanism 3 as the control command value from a viewpoint of simplifying control signals more.

(Sealant Application Method)

Next, a sealant application method of a fastener F using the sealant application apparatus 1 will be described.

Figure 4:
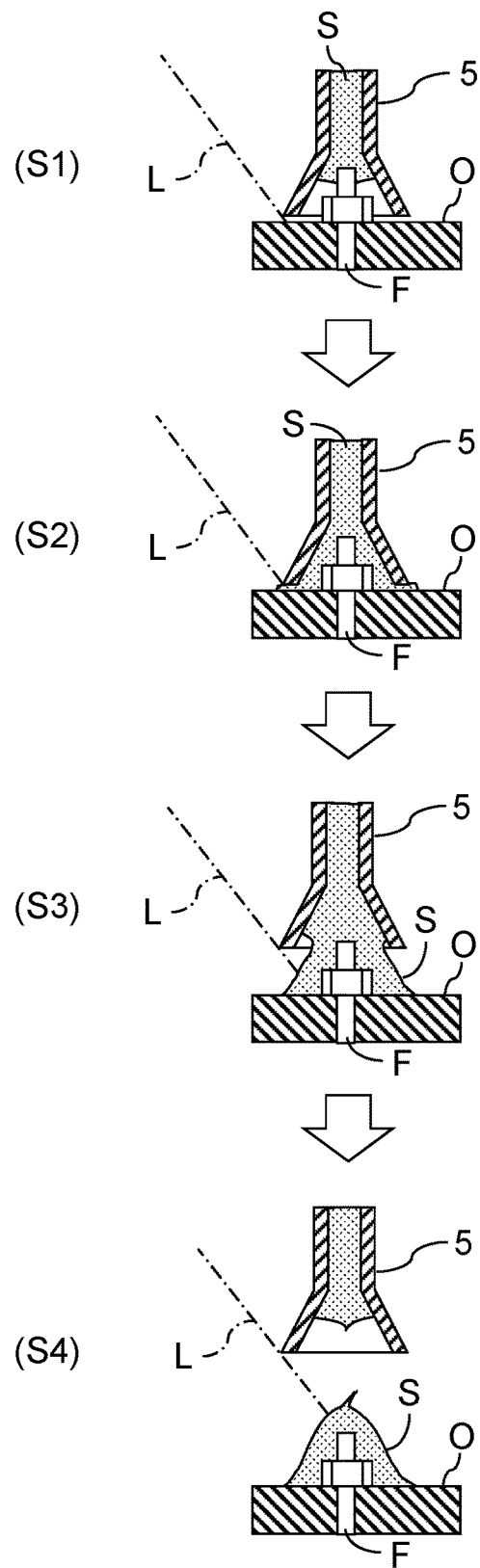
FIG. 4 shows a flow for applying sealant to a fastener using the sealant application apparatus shown in FIG. 1.

FIG. 4 shows a flow for applying sealant S to a fastener F using the sealant application apparatus 1 shown in FIG. 1.

First, in step S1, the seal gun 2 including the nozzle 5 is positioned to the initial position. Specifically, the seal gun 2 is positioned so that a suitable clearance may be formed between the edge of the end portion of the nozzle 5 and the surface of the object O. The distance between the end portion of the nozzle 5 and the surface of the object O is determined so that the inside of the nozzle 5 can be filled up with the sealant S in a state where the fastener F to be applied with the sealant S is almost covered with the nozzle 5 while a part of the sealant S filling up the inside of the nozzle 5 may leak out from the clearance between the end portion of the nozzle 5 and the surface of the object O.

Experientially, it is considered that making the distance between the end portion of the nozzle 5 and the surface of the object O not less than 0.5 mm and not more than 5 mm allows the filling up of the inside of the nozzle 5 with the sealant S and the leakage of the sealant S of an appropriate quantity out to the outside of the nozzle 5.

The positioning of the seal gun 2 is performed by the operation of the moving mechanism 3, such as the articulated robot 3A, which moves the seal gun 2 under the control by the controller 4. The positioning of the seal gun 2 so that the fastener F to be applied with the sealant S may be covered with the end portion of the nozzle 5 can be performed by two-dimensional positioning of the seal gun 2 and subsequent one-dimensional positioning of the seal gun 2. The two-dimensional positioning is positioning in directions vertical to the length direction of the fastener F and the center axis AX of the nozzle 5. Meanwhile, the one-dimensional positioning is positioning in the length direction of the fastener F and the center axis AX direction of the nozzle 5.

The two-dimensional positioning of the seal gun 2 in directions vertical to the length direction of the fastener F and the center axis AX of the nozzle 5 can be performed after adjusting the direction of the seal gun 2 beforehand so that the center axis AX of the nozzle 5 may become parallel to the length direction of the fastener F. The two-dimensional positioning can be performed by making the seal gun 2 approach the object O and subsequently translating the seal gun 2 in parallel with the moving mechanism 3 so that the center axis AX of the nozzle 5 and the center axis of the fastener F may lie on a same straight line. As a matter of course, these movements may be simultaneously performed with the moving mechanism 3.

The accuracy required for the two-dimensional positioning of the seal gun 2 in directions vertical to the center axis AX of the nozzle 5 and the length direction of the fastener F is usually rough since the sealant S deforms due to its viscosity. Therefore, the two-dimensional positioning of the seal gun 2 in directions vertical to the center axis AX of the nozzle 5 and the length direction of the fastener F can be performed by installing control program, by which the position of the fastener F is defined beforehand, into the controller 4 and controlling the moving mechanism 3 by the control program.

Alternatively, the fastener F may be photographed with an image sensor, such as an optical camera, and the center axis of the fastener F may be automatically detected in the controller 4 by image processing, such as contour extraction processing, or image recognition processing, such as pattern matching processing. In that case, a necessary image sensor can be disposed at an appropriate position.

Meanwhile, the accuracy required for the one-dimensional positioning of the seal gun 2 in the center axis AX direction of the nozzle 5 and the length direction of the fastener F is high in many cases to such an extent that the influence of an positioning error of the object O to a jig or the like is not negligible since the distance between the end portion of the nozzle 5 and the surface of the object O is in the order of millimeter.

Accordingly, the one-dimensional positioning of the seal gun 2 in the center axis AX direction of the nozzle 5 and the length direction of the fastener F can be performed by bringing the end portion of the nozzle 5 into contact with the surface of the object O once by an operation of the moving mechanism 3, and subsequently moving the end portion of the nozzle 5 away from the surface of the object O by a predetermined distance, after the two-dimensional positioning of the seal gun 2 in directions vertical to the center axis AX of the nozzle 5 and the length direction of the fastener F has been completed.

Whether the end portion of the nozzle 5 has contacted with the surface of the object O can be detected with the force sensor 3B attached to the moving mechanism 3. That is, when the measured value of the pressure, output from the force sensor 3B, in the center axis AX direction of the nozzle 5 and the length direction of the fastener F exceeded a threshold value, it can be determined that the end portion of the nozzle 5 has contacted with the surface of the object O. Therefore, the one-dimensional positioning of the seal gun 2 can be performed by control of the moving mechanism 3 by the controller 4 based on the measured value of the pressure, output from the force sensor 3B, in the center axis AX direction of the nozzle 5 and the length direction of the fastener F in addition to the control program.

Alternatively, the distance to the surface of the object O may be measured with the laser distance meter 15 fixed to the nozzle 5 or another distance meter additionally attached to the nozzle 5, and the one-dimensional positioning of the seal gun 2 may be performed so that the distance between the end portion of the nozzle 5 and the surface of the object O may become a predetermined distance. In this case, the one-dimensional positioning of the seal gun 2 may be performed without contacting the end portion of the nozzle 5 on the surface of the object O.

Moreover, the measured value of the distance to the surface of the object O is output to the controller 4 from the laser distance meter 15 fixed to the nozzle 5 or another distance meter additionally attached to the nozzle 5. Then, the one-dimensional positioning of the seal gun 2 in the center axis AX direction of the nozzle 5 and the length direction of the fastener F is performed by control of the moving mechanism 3 by the controller 4 based on the measured value of the distance between the end portion of the nozzle 5 and the surface of the object O.

When the three-dimensional positioning of the seal gun 2 including the nozzle 5 to the initial position has been completed as described above, the sealant S can be started to be discharged in step S2. For that purpose, control signals are output from the controller 4 to the dispenser 6 of the seal gun 2, and thereby the sealant S is supplied from the dispenser 6 into the nozzle 5.

When the seal gun 2 has the structure exemplified by FIG. 3, for example, a control signal is output from the controller 4 to the motor 11, and thereby the motor 11 is rotated. Accordingly, the torque output from the output shaft of the motor 11 is transmitted to the ball screw 12 through the pulleys 13 and the power transmission belt 14. Thereby, the ball screw 12 rotates, and the rod 8 fixed to the internal thread fasten to the ball screw 12 moves toward the cartridge 10. As a result, the sealant S stored in the cartridge 10 is pushed out into the nozzle 5 by the pusher 9 attached to the end of the rod 8.

When the sealant S is supplied into the nozzle 5, the space formed in the nozzle 5 is filled up with the sealant S in a state that a clearance is formed between the surface of the object O and the nozzle 5. As a result, the sealant S is applied to all over the fastener F. When the sealant S is further supplied into the nozzle 5, a part of the sealant S leaks out from the clearance between the end portion of the nozzle 5 and the surface of the object O.

When the sealant S leaked out to the outside of the nozzle 5, the laser light L transmitted and received between the laser distance meter 15 and the surface of the object O is interrupted by the sealant S. That is, the laser light L emitted from the laser distance meter 15 reflects on the surface of the sealant S. As a result, the measured value of the distance by the laser distance meter 15 decreases.

Accordingly, the controller 4 which continuously acquires the measured distance from the laser distance meter 15 can detect that the fastener F has been entirely immersed in the sealant S by filling up the inside of the nozzle 5 with the sealant S. Specifically, the controller 4 performs threshold processing of the measured distance acquired from the laser distance meter 15. Then, when the measured distance acquired from the laser distance meter 15 became below a threshold value, it can be automatically determined that the laser light L, which was being reflected on the surface of the object O, is now being reflected on the surface of the sealant S. That is, the controller 4 can automatically detect that the inside of the nozzle 5 has been filled up with the sealant S.

When the leakage of the sealant S to the outside of the nozzle 5 has been detected in the controller 4 as described above, the nozzle 5 is started to be retracted from the object O and the fastener F in step S3. That is, the controller 4 controls the moving mechanism 3 to retract the seal gun 2 in the center axis AX direction of the nozzle 5 and the length direction of the fastener F in response to the triggering event that the leakage of the sealant S to the outside of the nozzle 5 was detected.

At the beginning of retracting the seal gun 2, the seal gun 2 is retracted at an initial speed experientially determined previously. The initial speed for retracting the seal gun 2 can be defined by a control program. Therefore, the controller 4 can output the initial value of a speed control signal to the moving mechanism 3 according to the control program.

Meanwhile, after the seal gun 2 has been started to be retracted, the moving mechanism 3 can be feedback controlled by the controller 4 so that the deviation quantity between the reference value defined by the control program and the distance to the surface of the sealant S measured with the laser distance meter 15 may become the minimum.

Specifically, once the seal gun 2 is started to be retracted, the sealant S deforms since the sealant S which was filling up the inside of the nozzle 5 is released in the atmosphere. Moreover, the measuring position of the distance by the laser distance meter 15 fixed to the nozzle 5 moves relatively to the applied sealant S in the direction away from the surface of the object O gradually.

Accordingly, the deviation of the actual shape of the sealant S from the ideal shape of the sealant S applied on the fastener F, i.e., a cap seal can be observed with the laser distance meter 15. More specifically, the ideal distance from the laser distance meter 15 to the surface of the sealant S on a plane on which the laser light L is transmitted and received can be uniquely found based on the ideal shape of the cap seal. Therefore, the deviation of the actual shape of the sealant S from the ideal shape of the cap seal can be expressed using an index consisting of the difference or ratio between the distance actually measured by the laser distance meter 15 and the ideal distance from the laser distance meter 15 to the surface of the sealant S on the plane on which the laser light L is transmitted and received.

Accordingly, the ideal distance from the laser distance meter 15 to the surface of the sealant S can be defined as reference value in the control program, and the speed or position for retracting the seal gun 2 can be feedback controlled so that the difference or ratio between the reference value defined in the control program and the distance from the laser distance meter 15 to the surface of the sealant S actually measured with the laser distance meter 15 may become the minimum. Thereby, the form of the sealant S can be made to approach an ideal form.

When the seal gun 2 is gradually retracted from the surface of the object O by the above-mentioned automatic control of the moving mechanism 3 by controller 4 while discharging the sealant S is stopped, the sealant S attached to the fastener F and the surface of the object O is instantly divided from the sealant S in the nozzle 5 as shown in step S4. That is, the sealant S is applied to the fastener F and the surface of the object O in an almost dome form or an almost bell form due to the adhesibility of the sealant S.

The distance to the surface of the sealant S can be also measured with the laser distance meter 15 after the sealant S attached to the fastener F and the surface of the object O was divided from the sealant S in the nozzle 5 as well as just before the division. Accordingly, the discharge of the sealant S can be stopped automatically by predicting the time at which the sealant S attached to the fastener F and the surface of the object O is divided from the sealant S in the nozzle 5, by measuring the distance to the surface of the sealant S just before the sealant S attached to the fastener F and the surface of the object O is divided from the sealant S in the nozzle 5, with the laser distance meter 15.

Specifically, the relationship between the distance from the laser distance meter 15 to the surface of the sealant S and appropriate timing at which the discharge of the sealant S should be stopped can be obtained experientially and defined in the control program. Thereby, when the distance from the laser distance meter 15 to the surface of the sealant S becomes the distance defined in the control program, the discharge of the sealant S can be stopped by automatically controlling the dispenser 6 by the controller 4.

When the seal gun 2 has the structure exemplified by FIG. 3, for example, the rotation of the motor 11 can be stopped by outputting a control signal from the controller 4 to the motor 11. Thereby, the discharge of the sealant S from the dispenser 6 and the seal gun 2 can be stopped.

As described above, retraction of the seal gun 2 and stopping discharge of the sealant S can be performed while observing an application state of the sealant S with the laser distance meter 15. When the fastener F has been applied with the sealant S by the sealant application apparatus 1, a sealant applied product including the cap sealed fastener F and the object O can be produced.

(Effects)

As described above, in the sealant application apparatus 1 and the method of producing a sealant applied product, the distance to the surface of the sealant S is measured with the laser distance meter 15, and application conditions of the sealant S including the speed for retracting the seal gun 2 and the timing of stopping discharging the sealant S are controlled in real time based on the measured distance to the surface of the sealant S.

Therefore, according to the sealant application apparatus 1 and the method of producing a sealant applied product, a cap seal of the fastener F with the sealant S whose viscosity or elasticity changes for a short time can be automatically and stably performed using simpler devices and equipment without deterioration in quality.

Specifically, even when the quantity of the sealant S discharged out from the nozzle 5 becomes unstable during cap sealing of the fastener F due to a change of the viscosity or elasticity of the sealant S, the nozzle 5 can be retracted from the fastener F at timing and a speed according to the position of the surface of the sealant S while the discharge of the sealant S can be stopped according to the position of the surface of the sealant S. Accordingly, the sealant S can be applied to the fastener F so that the sealant S may become more suitable form. That is, it becomes possible to perform a cap seal of the fastener F with high quality.

In addition, even when the sealant S is made by mixture of two liquids, the seal gun 2 does not have to include a mechanism for the mixture of the two liquids since it is possible to apply the sealant S to the fastener F stably regardless of a change of the viscosity or elasticity of the sealant S. As a result, the seal gun 2 can be prevented from having complicated structure as well as the maintenance of the seal gun 2 becomes easy. In addition, equipment, such as a heater and an air conditioner, for delaying curing of the sealant S can also be made unnecessary.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

For example, although an example of measuring the distance to the surface of the sealant S with the laser distance meter 15 has been described in the above-mentioned implementation, the distance to the surface of the sealant S may be measured using a desired distance meter, such as an ultrasonic distance meter, instead of the laser distance meter 15.

What is claimed is:

1. A sealant application apparatus for applying sealant to a fastener fastened to an object, the apparatus comprising:
    a seal gun having a nozzle for discharging the sealant toward the fastener, a front end portion of the nozzle having a shape corresponding to an initial shape of the sealant applied to the fastener;
    a distance meter, fixed to the nozzle, for measuring a distance from a measurement position to a surface of the sealant discharged from the nozzle and covering the fastener;
    a moving mechanism configured to move the seal gun together with the distance meter relatively to the fastener, the moving mechanism including at least one of an articulated robot, gears, a ball screw, a caterpillar track, a cylinder, wheels and rollers; and
    a controller configured to control the moving mechanism and the seal gun,
    wherein the controller is configured to control the moving mechanism and the seal gun so that:
    the sealant is started to be discharged out from the seal gun in a state where the nozzle has been positioned to cover the fastener at a position away from a surface of the object by a predetermined distance, and subsequently,
    the sealant is applied to the fastener under a sealant application condition according to the distance measured by the distance meter while moving the nozzle away from the surface of the object, and
    wherein, based on the distance measured by the distance meter, the controller is configured to determine timing to start a movement of the moving mechanism for moving the nozzle away from the surface of the object, a speed of the movement of the moving mechanism, and timing to stop discharging the sealant from the seal gun.

2. The sealant application apparatus according to claim 1, wherein the distance meter is disposed at a position at which the distance meter can measure the distance from the measurement position to the surface of the sealant, on a plane including a center axis of the nozzle.

3. A method of producing a sealant applied product including the object and the cap-sealed fastener, the method comprising:
    applying the sealant to the fastener by the sealant application apparatus according to claim 2.

4. The sealant application apparatus according to claim 1, wherein, after a movement of the moving mechanism for moving the nozzle away from the surface of the object has been started, the controller is configured to perform feedback control of a speed of the movement so that the distance measured by the distance meter becomes close to a distance corresponding to an ideal shape of the sealant applied to the fastener.

5. The sealant application apparatus according to claim 4, wherein the distance meter is disposed at a position at which the distance meter can measure the distance from the measurement position to the surface of the sealant, on a plane including a center axis of the nozzle.

6. A method of producing a sealant applied product including the object and the cap-sealed fastener, the method comprising:
    applying the sealant to the fastener by the sealant application apparatus according to claim 5.

7. A method of producing a sealant applied product including the object and the cap-sealed fastener, the method comprising:
    applying the sealant to the fastener by the sealant application apparatus according to claim 4.

8. A method of producing a sealant applied product including the object and the cap-sealed fastener, the method comprising:
    applying the sealant to the fastener by the sealant application apparatus according to claim 1.

* * * * *